United States Patent
Siddiqui et al.

(10) Patent No.: US 10,761,572 B1
(45) Date of Patent: Sep. 1, 2020

(54) HINGED DEVICE

(71) Applicant: Microsoft Technology Licensing, LLC, Redmond, WA (US)

(72) Inventors: Kabir Siddiqui, Sammamish, WA (US); Rajesh Dighde, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/363,931

(22) Filed: Mar. 25, 2019

(51) Int. Cl.
*G06F 1/16* (2006.01)
*E05D 7/00* (2006.01)

(52) U.S. Cl.
CPC ............ *G06F 1/1681* (2013.01); *E05D 7/00* (2013.01); *G06F 1/1616* (2013.01); *G06F 1/1652* (2013.01); *E05Y 2900/606* (2013.01); *G06F 1/163* (2013.01); *G06F 1/1626* (2013.01)

(58) Field of Classification Search
CPC ........................................................ H05K 5/00
See application file for complete search history.

(56) References Cited

U.S. PATENT DOCUMENTS

| | | | |
|---|---|---|---|
| 9,176,535 B2 | 11/2015 | Bohn et al. | |
| 9,250,733 B2 | 2/2016 | Lee et al. | |
| 9,348,450 B1 | 5/2016 | Kim | |
| 9,477,269 B2 | 10/2016 | Morrison et al. | |
| 9,557,771 B2 | 1/2017 | Park et al. | |
| 9,857,849 B1 | 1/2018 | Siddiqui et al. | |
| 10,227,808 B2 | 3/2019 | Siddiqui | |
| 10,241,548 B2 | 3/2019 | Tazbaz et al. | |
| 10,296,044 B2 | 5/2019 | Siddiqui et al. | |
| 10,306,783 B2 | 5/2019 | Seo et al. | |
| 10,306,788 B2 | 5/2019 | Bi et al. | |
| 10,344,510 B2 | 7/2019 | Siddiqui et al. | |
| 2012/0120618 A1 | 5/2012 | Bohn | |
| 2012/0307472 A1 | 12/2012 | Bohn et al. | |

(Continued)

FOREIGN PATENT DOCUMENTS

| | | | |
|---|---|---|---|
| EP | 1464784 A1 | 10/2004 | |
| EP | 2728432 A1 | 5/2014 | |

(Continued)

OTHER PUBLICATIONS

"Final Office Action Issued in U.S. Appl. No. 15/656,776", dated Mar. 22, 2019, 12 Pages.

(Continued)

*Primary Examiner* — Jerry Wu

(74) *Attorney, Agent, or Firm* — Rainier Patents, P.S.

(57) ABSTRACT

The description relates to hinged devices. One example relates to a device that has a first portion and a second portion. The device can include a hinge assembly secured to the first portion and the second portion and a flexible display secured to the first portion and the second portion. The device can include a support member positioned between the hinge assembly and the flexible display. The hinge assembly can be configured to control a length of the device as defined by the first portion, the hinge assembly, and the second portion, based at least in part upon an orientation of the first and second portions, and configured to control a shape of the support member based at least in part upon the orientation of the first and second portions.

19 Claims, 13 Drawing Sheets

(56) References Cited

U.S. PATENT DOCUMENTS

| | | |
|---|---|---|
| 2013/0021762 A1 | 1/2013 | van dijk et al. |
| 2014/0042293 A1* | 2/2014 | Mok .................. G09F 9/301 |
| | | 248/682 |
| 2014/0111954 A1 | 4/2014 | Lee et al. |
| 2015/0077917 A1 | 3/2015 | Song |
| 2015/0116917 A1* | 4/2015 | Aono .................. G06F 1/1681 |
| | | 361/679.04 |
| 2015/0153787 A1 | 6/2015 | Mok et al. |
| 2015/0185782 A1 | 7/2015 | Kim et al. |
| 2015/0233162 A1 | 8/2015 | Lee et al. |
| 2015/0241978 A1 | 8/2015 | Lombardi et al. |
| 2015/0378397 A1 | 12/2015 | Park et al. |
| 2016/0085265 A1 | 3/2016 | Park et al. |
| 2016/0109908 A1 | 4/2016 | Siddiqui |
| 2016/0378203 A1 | 12/2016 | Kim et al. |
| 2017/0013729 A1 | 1/2017 | Rothkopf et al. |
| 2017/0060188 A1 | 3/2017 | Han et al. |
| 2017/0115701 A1 | 4/2017 | Bae et al. |
| 2017/0145724 A1 | 5/2017 | Siddiqui |
| 2017/0201607 A1 | 7/2017 | Xu |
| 2017/0272559 A1 | 9/2017 | Cavallaro et al. |
| 2018/0066465 A1 | 3/2018 | Tazbaz et al. |
| 2018/0196467 A1 | 7/2018 | Watamura et al. |
| 2018/0196468 A1 | 7/2018 | Watamura et al. |
| 2018/0213663 A1 | 7/2018 | Lin |
| 2018/0292860 A1 | 10/2018 | Siddiqui |
| 2019/0005857 A1 | 1/2019 | Wakata |
| 2019/0082544 A1 | 3/2019 | Park |
| 2019/0094917 A1 | 3/2019 | Schmelzle et al. |
| 2019/0278338 A1 | 9/2019 | Siddiqui |

FOREIGN PATENT DOCUMENTS

| | | |
|---|---|---|
| EP | 2728433 A1 | 5/2014 |
| EP | 3109847 A1 | 12/2016 |
| EP | 3386172 A1 | 10/2018 |
| KR | 20170142597 A | 12/2017 |
| KR | 20190042530 A | 4/2019 |
| WO | 2017114465 A1 | 7/2017 |

OTHER PUBLICATIONS

"Non Final Office Action Issued in U.S. Appl. No. 15/656,776", dated Jul. 30, 2019, 12 Pages.

"Non Final Office Action Issued in U.S. Appl. No. 15/656,776", dated Sep. 11, 2018, 11 Pages.

"Notice of Allowance Issued in U.S. Appl. No. 15/656,776", dated Jan. 23, 2020, 10 Pages.

"Notice of Allowance Issued in U.S. Appl. No. 16/275,097", dated Sep. 23, 2019, 10 Pages.

"International Search Report and Written Opinion for PCT Application No. PCT/US19/020179", dated May 24, 2019, 11 Pages.

"International Search Report and Written Opinion Issued in PCT Application No. PCT/US2018/024698", dated Jun. 8, 2018, 13 Pages.

Price, Rob, "Analysts Think that Samsung will Launch a Smartphone with a Foldable Screen this Year", Retrieved From: http://www.businessinsider.in/Analysts-think-that-Samsung-will-launch-a-smartphone-with-a-foldable-screen-this-year/articleshow/50469072.cms, Jan. 6, 2016, 37 Pages.

"International Search Report and Written Opinion Issued in PCT Application No. PCT/US19/049622", dated Dec. 3, 2019, 12 Pages.

"Notice of Allowance Issued in U.S. Appl. No. 16/404,592", dated Sep. 19, 2019, 9 Pages.

"International Search Report and Written Opinion Issued in PCT Application No. PCT/US2019/063127", dated Mar. 17, 2020, 10 pages.

* cited by examiner

HINGED DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

DESCRIPTION

The present concepts relate to devices, such as computing devices employing hinge assemblies that can rotationally secure first and second device portions. A flexible display can be secured to both the first and second portions. The hinge assembly can provide several features that facilitate the use of a single flexible display across both portions. During rotation of the first and second portions, the hinge assembly can change the effective length of the device that lies beneath the flexible display to reduce stresses imparted on the flexible display. This aspect can be achieved with a cord that connects the first portion to the hinge assembly. A length of a pathway of the cord (e.g., cord pathway) can change during the rotation so that the cord draws the first portion toward the hinge assembly and/or allows the first portion to be biased away from the hinge assembly depending on the orientation. Another aspect relates to a deployable bridge support that can support the flexible display in some orientations. The deployment of the bridge support can be controlled by a second cord that can operate independently of the first cord.

Figure 1:
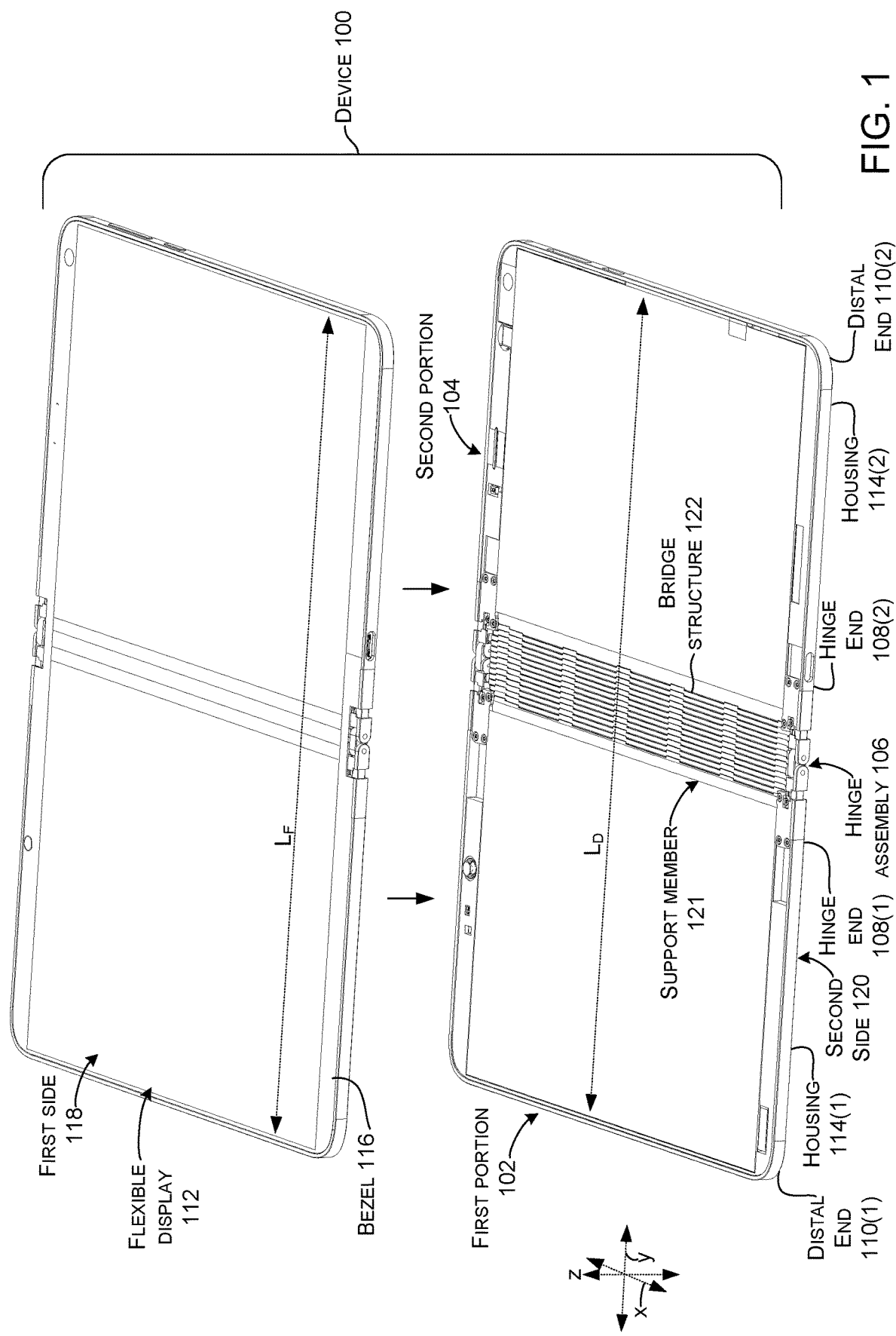
FIGS. 1 and 3A-3D show exploded perspective views of example devices in accordance with some implementations of the present concepts.

Introductory FIG. 1 shows an example device 100 that has first and second portions 102 and 104 that are rotatably secured together by a hinge assembly 106.

The first portion 102 and the second portion 104 can extend from a hinge end 108 to a distal end 110. A flexible display 112 can be positioned over the first portion 102, the hinge assembly 106, and the second portion 104. An example flexible display that is commercially available is an organic light emitting diode (OLED) display, though other types may be available and/or become available. The flexible display 112 can be secured to a housing 114 of both the first and second portions at a bezel 116. For purposes of explanation, the device can be described as having a first side or surface 118 (facing upwardly in FIG. 1) upon which the flexible display 112 is positioned and a second opposite side or surface 120 (facing downwardly in FIG. 1).

A support member 121, such as a deployable bridge structure 122 (shown in ghost because it underlies the flexible display 112) can be positioned between the flexible display 112 and the hinge assembly 106. The support member 121 can support the flexible display 112 over the hinge assembly 106.

Figure 2:
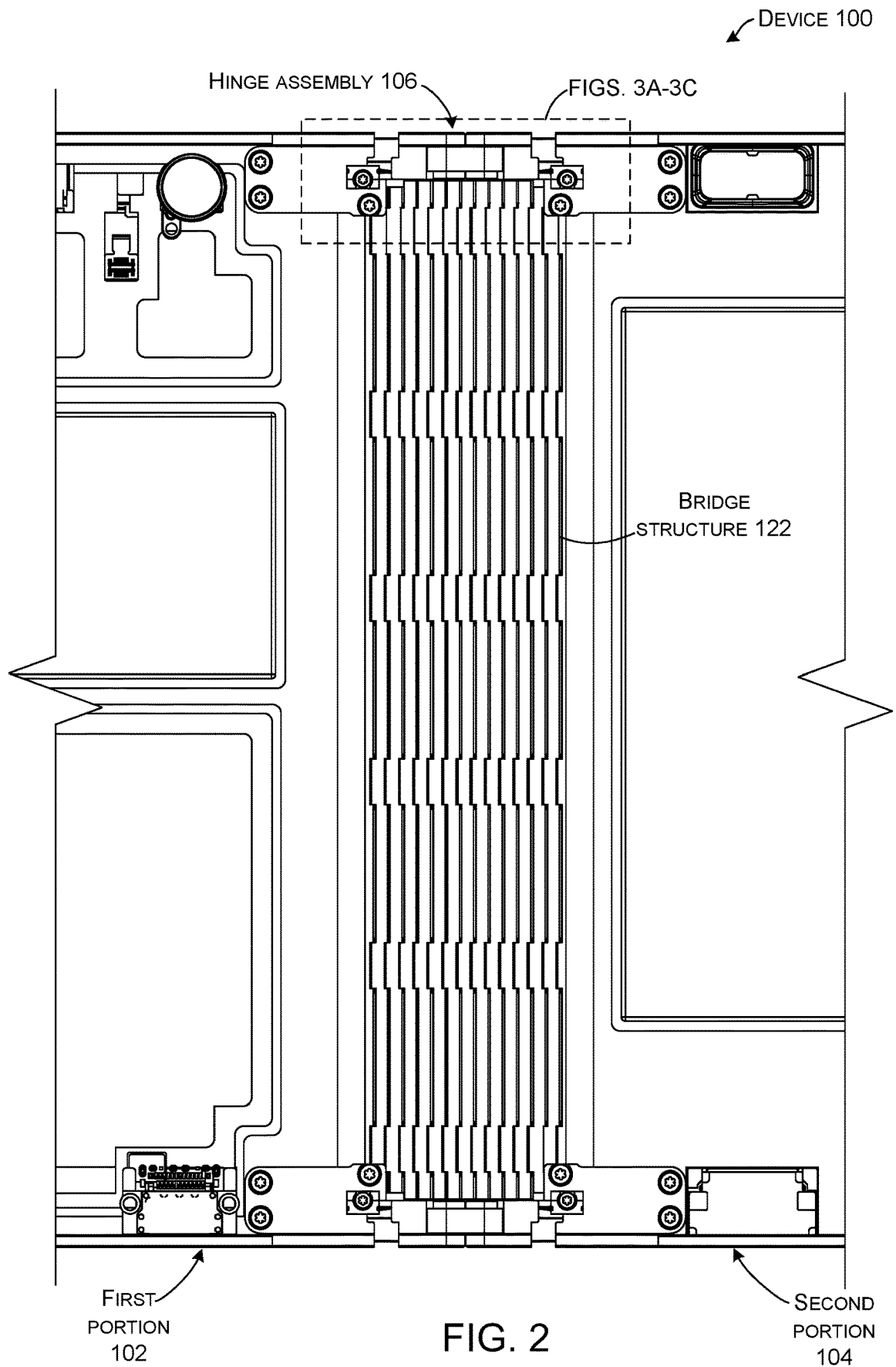
FIGS. 2, 4B, 4E, 5B, 5E, 6B, and 6E show elevational views of example devices in accordance with some implementations of the present concepts.
Figure 3A:
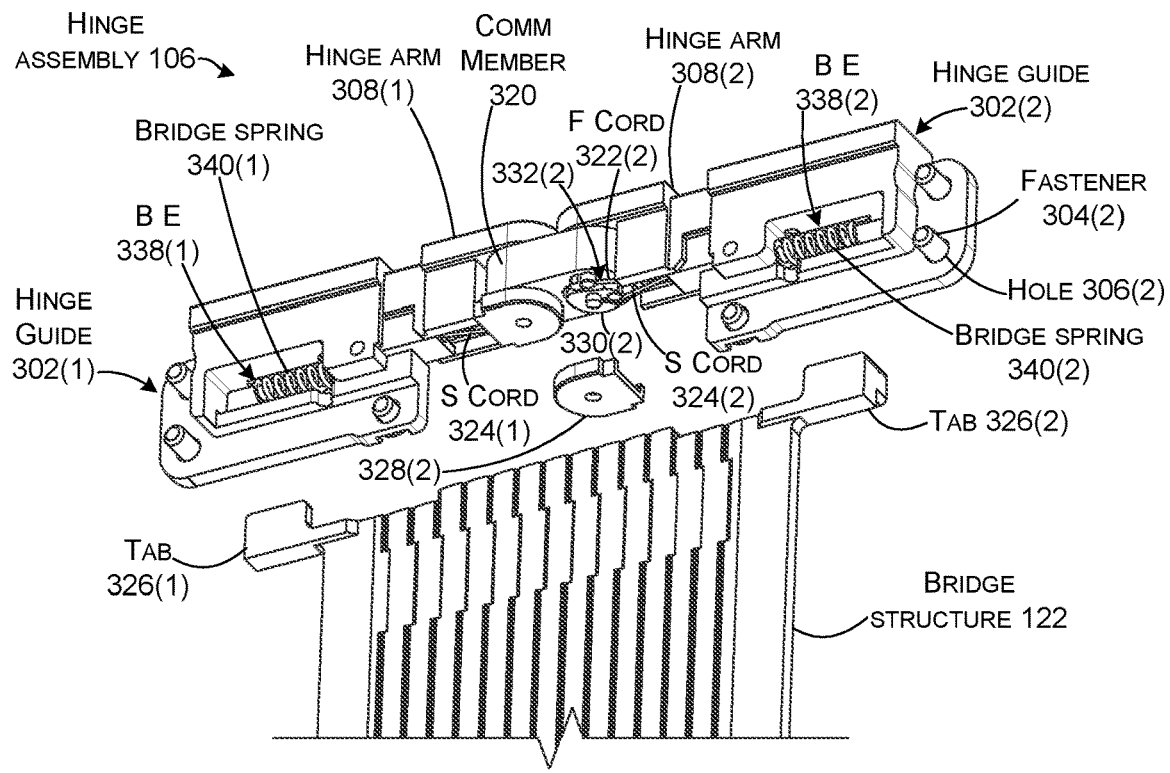
Figure 3B:
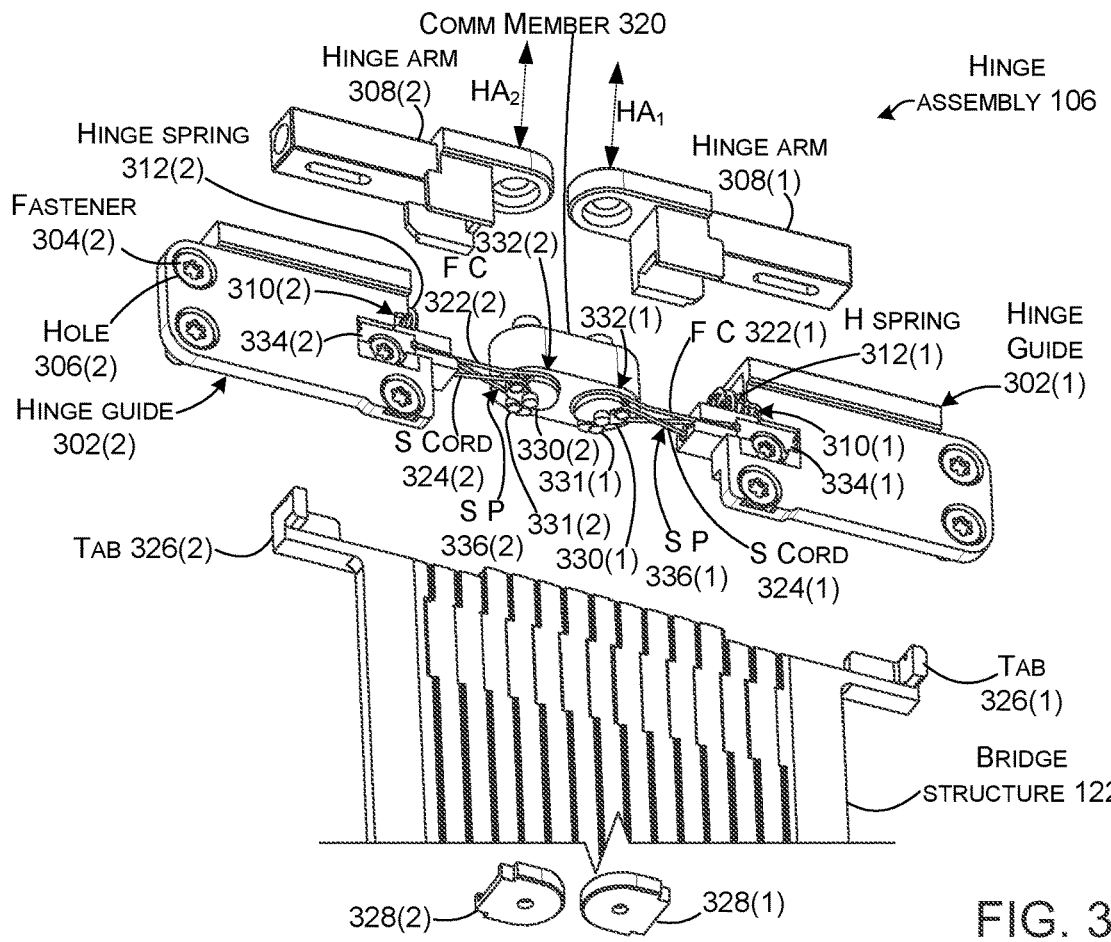
Figure 3C:
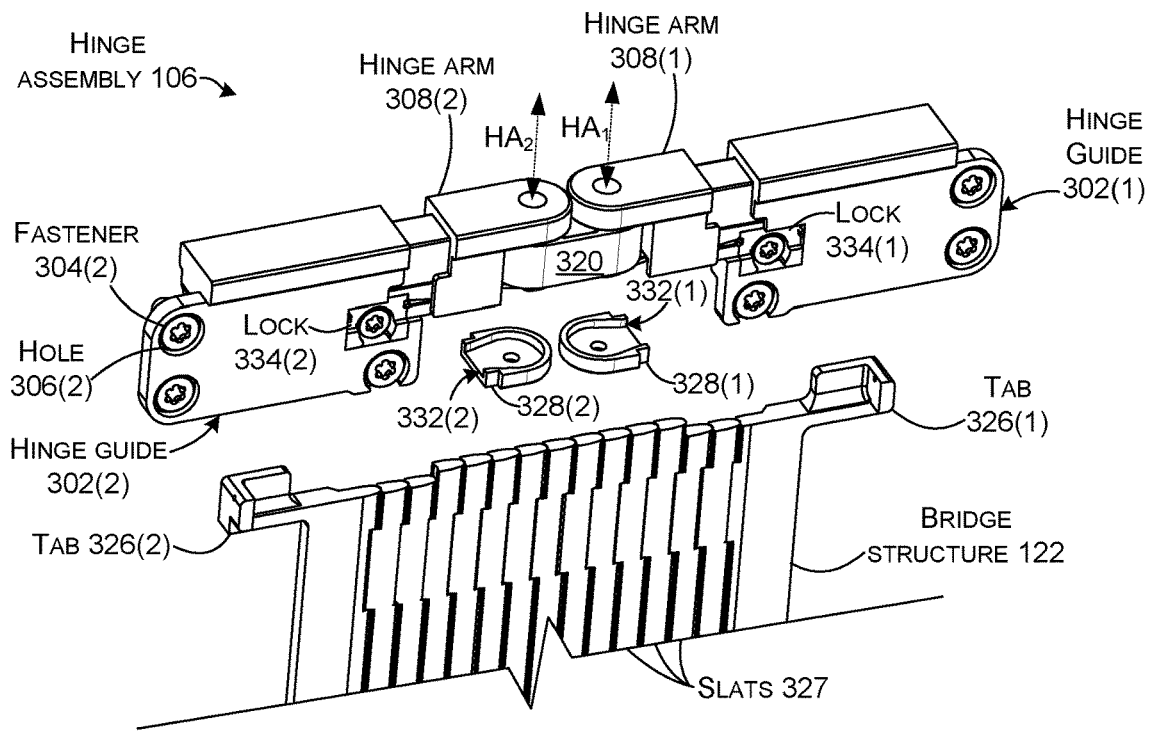
Figure 3D:
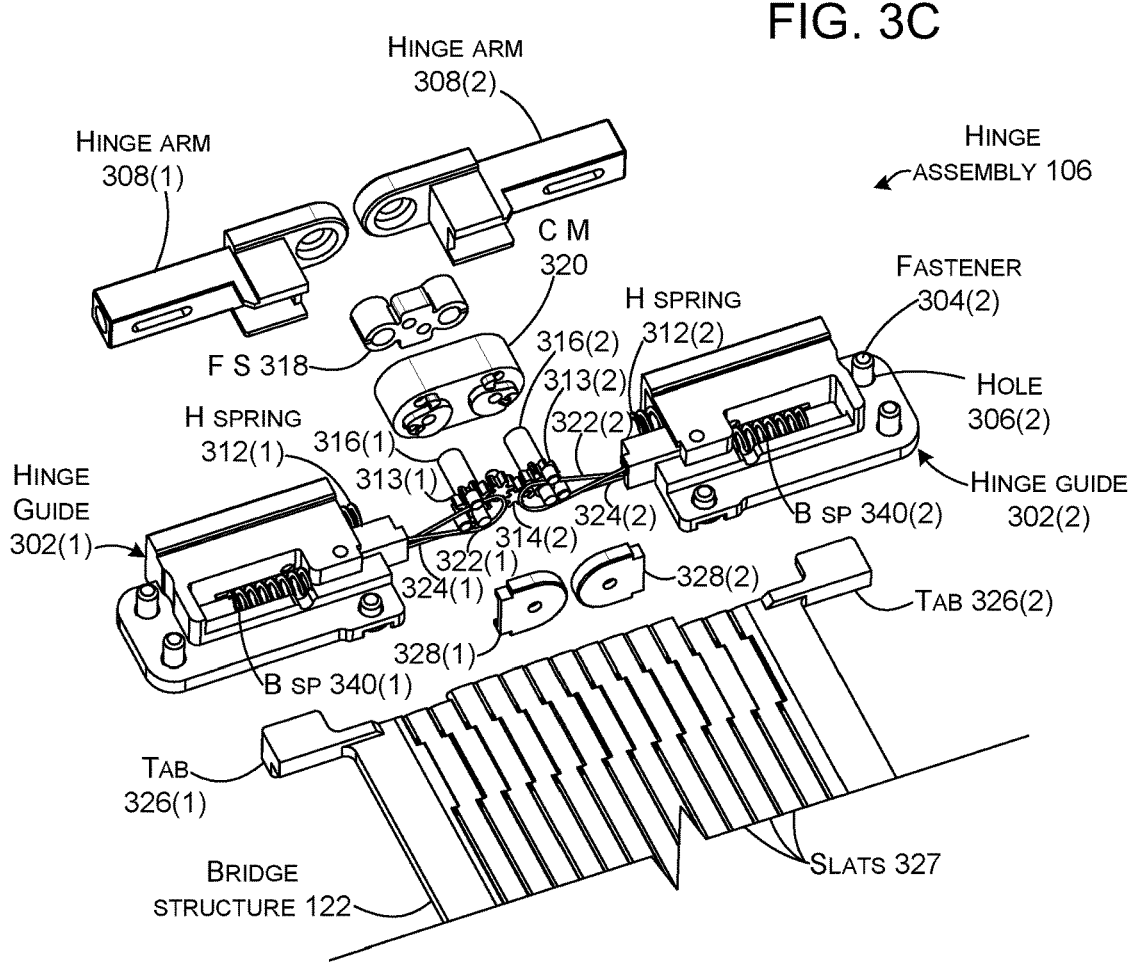

The deployable bridge structure 122 can be positioned between the flexible display 112 and the hinge assembly (106, FIGS. 1 and 2). In the open orientation of FIG. 1, the deployable bridge structure 122 can function to support the flexible display 112 over the hinge assembly 106 to create a uniform tactile feel across the device 100. Stated another way, without the deployable bridge structure 122, the flexible display might feel 'mushy' to the user over the hinge assembly 106 and solid over the first and second portions 102 and 104.

The flexible display 112 can be fixedly secured to both the first and second portions 102 and 104. The flexible display 112 can have a length $L_F$. The portion of the device 100 underlying the flexible display 112 can have a length $L_D$. To facilitate the fixedly secured configuration, the hinge assembly 106 can change the length $L_D$ of the device 100 (e.g., effective length) underlying the flexible display at various orientations of the rotation to reduce forces being imparted on the flexible display 112. Briefly, at the 180-degree orientation of FIG. 1, the length of the device $L_D$ and the length of the flexible display $L_F$ are approximately equal. The flexible display 112 tends to be above the neutral axis of the device. As such during rotation, the length of the flexible display 112 would traditionally have to change during rotation. Instead, in the present implementations, the hinge assembly 106 can change length $L_D$ during rotation to accommodate the flexible display. This aspect will be discussed in more detail below relative to FIGS. 4A-6E.

FIG. 2 shows regions of the first and second portions 102 and 104 joined to the hinge assembly 106 and oriented at 180-degrees. The flexible display 112 has been removed to show underlying elements, such as deployable bridge structure 122. The deployable bridge structure can be deployed to support the flexible display at the hinge assembly 106 when the first and second portions 102 and 104 are rotated from a closed orientation to an open orientation.

In this case, the deployable bridge structure 122 can be deployed over the hinge assembly 106 in the 180-degree orientation. The deployable bridge structure 122 can support the flexible display 112. The support offered by the bridge structures 122 can contribute to tactile symmetry across the flexible display 112 over the first portion 102, the hinge assembly 106, and the second portion 104 in the 180-degree orientation. Stated another way, the flexible display can feel substantially the same to the user across the entire device 100, such as when the user touches the flexible display as an input command.

When the first and second portions 102 and 104 are rotated to other orientations (e.g., less than or more than 180 degrees) the deployable bridge structure 122 can move to allow room for the flexible display to bend at the hinge assembly 106.

FIGS. 3A-3D, 4A-4E, 5A-5E, and 6A-6E collectively show more details of hinge assembly 106.

FIGS. 3A-3D are exploded perspective views that show hinge assembly 106 at the 180-degree orientation (as indicated in FIG. 2). FIGS. 4A-4E show a portion of hinge assembly 106 at the zero-degree orientation. FIGS. 5A-5E show a portion of hinge assembly 106 at the 180-degree orientation. FIGS. 6A-6E show a portion of hinge assembly 106 at the 360-degree orientation.

Looking at FIGS. 3A-3D, example hinge assembly 106 can include hinge guides 302 that can be secured to housings 114 (FIG. 1), in some manner, such as by fasteners 304 through holes 306 (not all of which are shown or designated with specificity). The hinge guides 302 can slideably receive hinge arms 308. A biasing element 310, such as hinge springs 312 can bias the hinge guides 302 and the hinge arms 308 apart (e.g., away) from one another.

The hinge arms 308 can include primary gears 313 which can interact with secondary gears 314. (An alternative implementation can omit the secondary gears and employ directly engaging primary gears). The primary and secondary gears can control rotation of the hinge arms 308 so that equal degrees of rotation occur around each hinge axis (HA). For instance, 20 degrees of rotation of hinge arm 308(1) around hinge axis $HA_1$ occurs concurrently with 20 degrees of rotation of hinge arm 308(2) around hinge axis $HA_2$.

The hinge arms 308 can include hinge shafts 316. The hinge shafts 316 can define the hinge axes of the hinge assembly 106. The hinge shafts 316 can be positioned relative to a friction sleeve 318. The friction sleeve 318 can in turn be received in a communication member 320. The friction sleeves 318 can provide resistance to rotation between the communication member 320 and the hinge arms 308 so that the hinge arms maintain an orientation set by the user until the user changes the orientation (e.g., the device maintains whatever orientation the user puts it in).

First cords 322 can be secured between the communication member 320 (e.g., the hinge axes) and the first and second portions (e.g., in this case, the hinge guides 302). In this implementation, there are two first cords 322: first cord 322(1) relates to hinge axis $HA_1$ and first portion 102 (FIG. 1 and represented in FIGS. 3A-3D by hinge guide 302(1)) and second cord 322(2) relates to hinge axis $HA_2$ and second portion 104 (FIG. 1 and represented in FIGS. 3A-3D by hinge guide 302(2)).

Second cords 324 can be secured between the communication member 320 (e.g., the hinge axes) and the bridge structure 122. In this implementation, second cord 324(1) relates to hinge axis $HA_1$ and a first end of the bridge structure 122 (e.g., the cord couples the communication member to the bridge structure). Similarly, second cord 324(2) relates to hinge axis $HA_2$ and a second end of the bridge structure 122. In this example, the first end is manifest as tab 326(1) and the second end is manifest as tab 326(2). The bridge structure can also include slats 327 that are pivotably and/or slideably inter-related to one another. The slats 327 can be interposed between the tabs 326.

Caps 328 can maintain the first and second cords 322 and 324 on the communication member 320. In this case, the communication member 320 can define cams 330 and/or protuberances 331 that operate relative to the hinge axes HA. The cams 330, protuberances 331, and/or the caps 328 can define a portion of a first pathway (e.g., cord pathway) 332 of the first cords 322. In this example, ends of first cords 322 can be secured to the hinge guides 302 with the first cords traveling along the first pathway 332 that can be defined around the cams 330 and back to the hinge guides 302. In this case, the first cords 322 are secured to the hinge guides 302 by locks 334. Rotation of the first and second portions can change the length of the first pathways 332 as experienced by the first cords 322.

Similarly, second cords 324 can extend along second pathways (e.g., cord pathway) 336 that extends from cams 330 to tabs 326. In this case, first ends of the second cords are secured relative to the cams 330 (shown but not specifically designated) and the second ends of the second cords are secured to the tabs via holes in the tabs (not shown because bridge structure is shown exploded away from the hinge assembly). Note that in this example, the first and second cords are associated with the same cams 330, but are related in different ways (e.g., engage different portions or profiles of the cams to effectuate the first and second pathways). In other implementations, separate cams could be dedicated to the first cords (e.g., first and second cams) and the second cords (e.g., third and fourth cams) to effect the first and second pathways 332 and 336.

Rotation of the first and second portions 102 and 104 can change the length of the second pathways 336 as experienced by the second cords 324. In this case, support member biasing elements 338, such as bridge springs 340 can bias the tabs 326 away from one another (e.g., away from the hinge assembly 106). At some orientations, the length of the second pathways 334 can cause the second cords 324 to overcome the bias and pull the tabs 326 toward one another (e.g., toward the hinge assembly 106). Note that the first pathways 332 and the first cords 322 operate independently of the second pathway 336 and the second cords 324, thus, the position of the first and second portions (102 and 104, FIG. 1) relative to the hinge assembly 106 can be controlled independently of the position of the bridge structure 122 through the range of orientations of the first and second portions.

FIGS. 4A-6E collectively illustrate the control aspects relating to the device length and the bridge structure configuration. FIGS. 4A-4E show the device 100 at a zero-degree orientation, FIGS. 5A-5E show the device at a 180-degree orientation, and FIGS. 6A-6E show the device at a 360-degree orientation. In the zero-degree orientation, the flexible display 112 is facing inwardly (e.g., against itself). In the 360-degree orientation, the flexible display 112 is facing outwardly (e.g., on the outside of the device). FIGS. 4A, 4B, 4D, 4E, 5A, 5B, 5D, 5E, 6A, 6B, 6D, and 6E show the hinge assembly 106 and the bridge structure 122 with the other elements removed. FIGS. 4C, 5C, and 6C show the flexible display 112 and the bridge structure 122.

As mentioned above, FIGS. 4A-4E collectively show the device 100 in the zero-degree orientation with the flexible display 112 on the inside (see FIG. 4C). Recall that the hinge springs 312 bias the hinge guides 302 and the hinge arms 308 away from one another. Moving the hinge guides and hinge arms away from one another serves to lengthen the device (e.g. the effective length). This bias can be countered by the first cords 322 pulling the hinge guides 302 toward the hinge assembly 106. The extent that the first cords pull the hinge guides depends upon the length of the first pathway 332 experienced by the first cords 322 at a given orientation.

In the zero-degree orientation, the protuberances 331 and the cams 330 collectively create a relatively long instance of first pathways 332. In this implementation, the first cords 322 are relatively inelastic. The first cords 322 are attached to the hinge guides 302. When exposed to the relatively long first pathways 332 of the zero-degree orientation, the first cords overcome the bias of the hinge springs 312 and pull the hinge guides 302 part way toward the hinge assembly 106 (e.g., toward the communication member 320). This aspect can be evidenced by the gap between the hinge guides 302 and the hinge arms 308 (e.g., gap length at orientation zero ($GL_0$)) being relatively small.

Figure 4A:
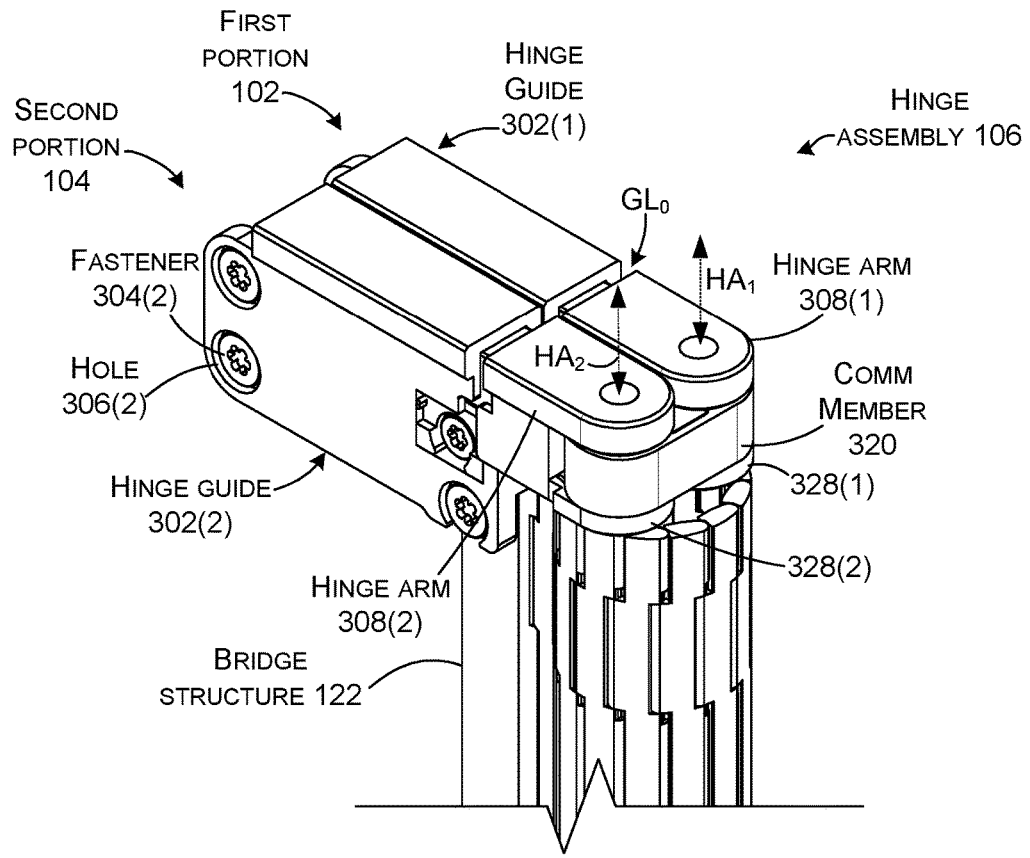
FIGS. 4A, 5A, and 6A show perspective views of example devices in accordance with some implementations of the present concepts.
Figure 4B:
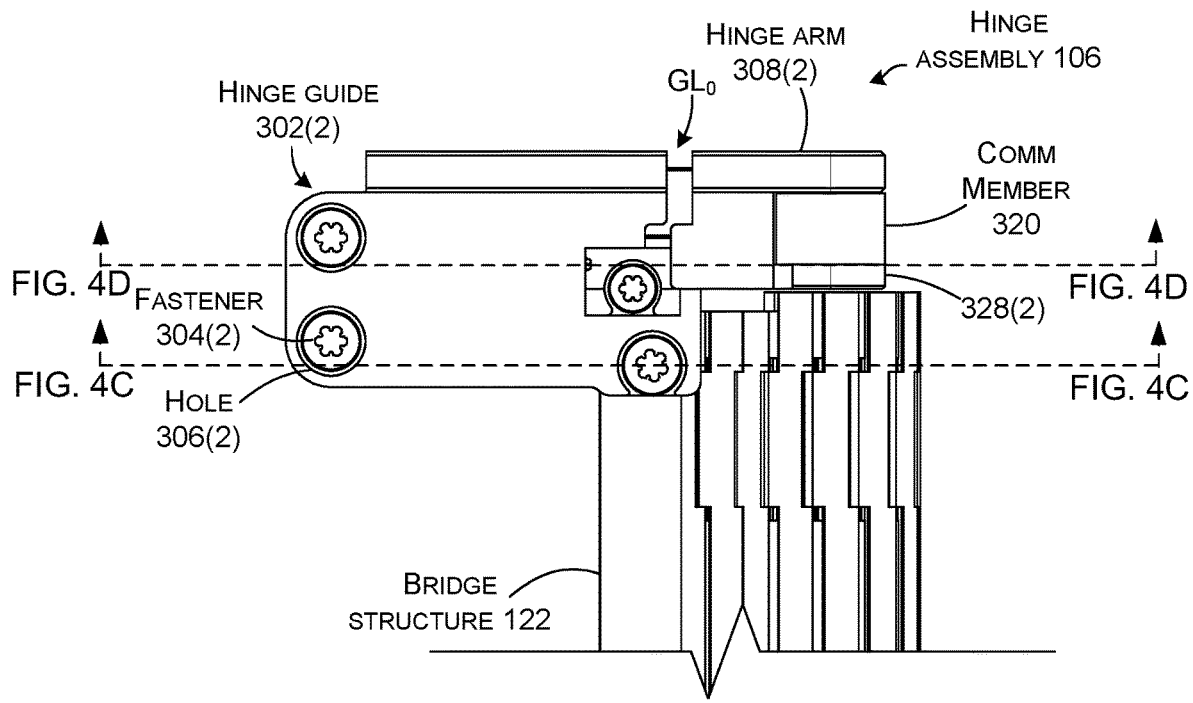
Figure 4C:
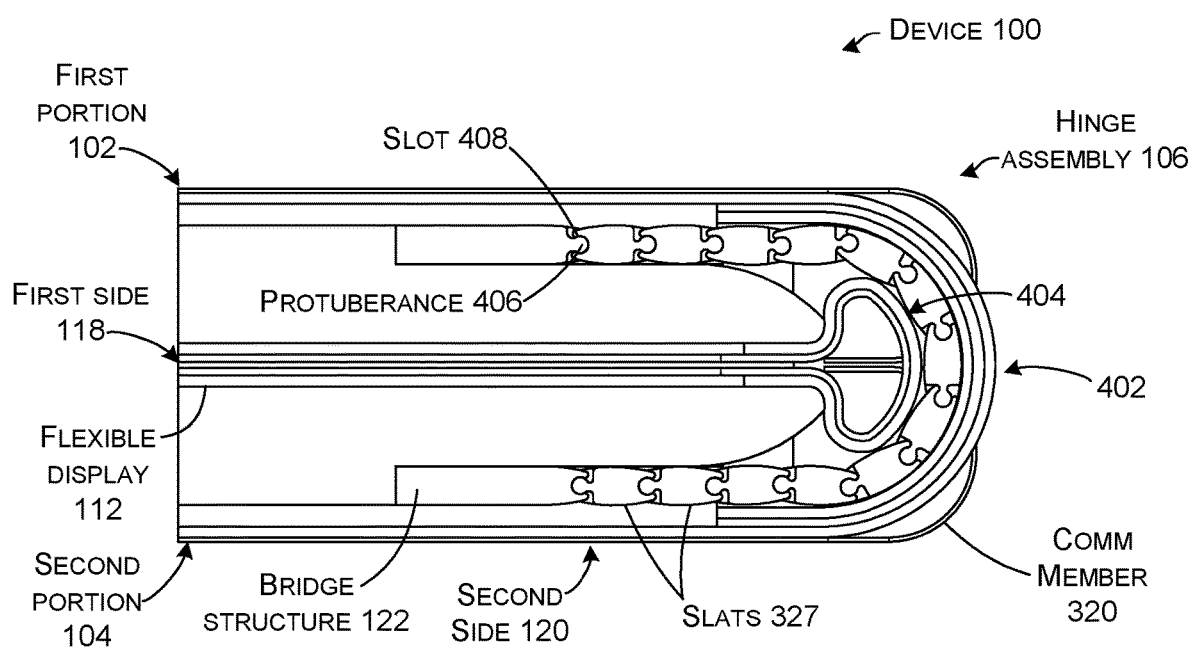
FIGS. 4C, 4D, 5C, 5D, 6C, and 6D show sectional views of example devices in accordance with some implementations of the present concepts.
Figure 4D:
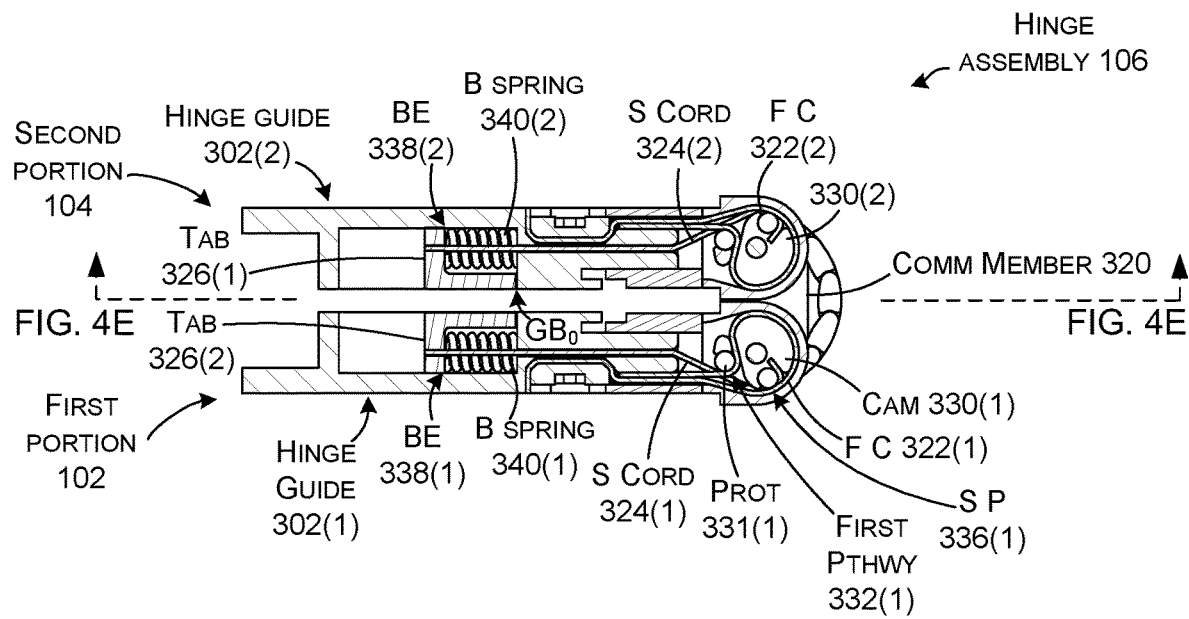
Figure 4E:
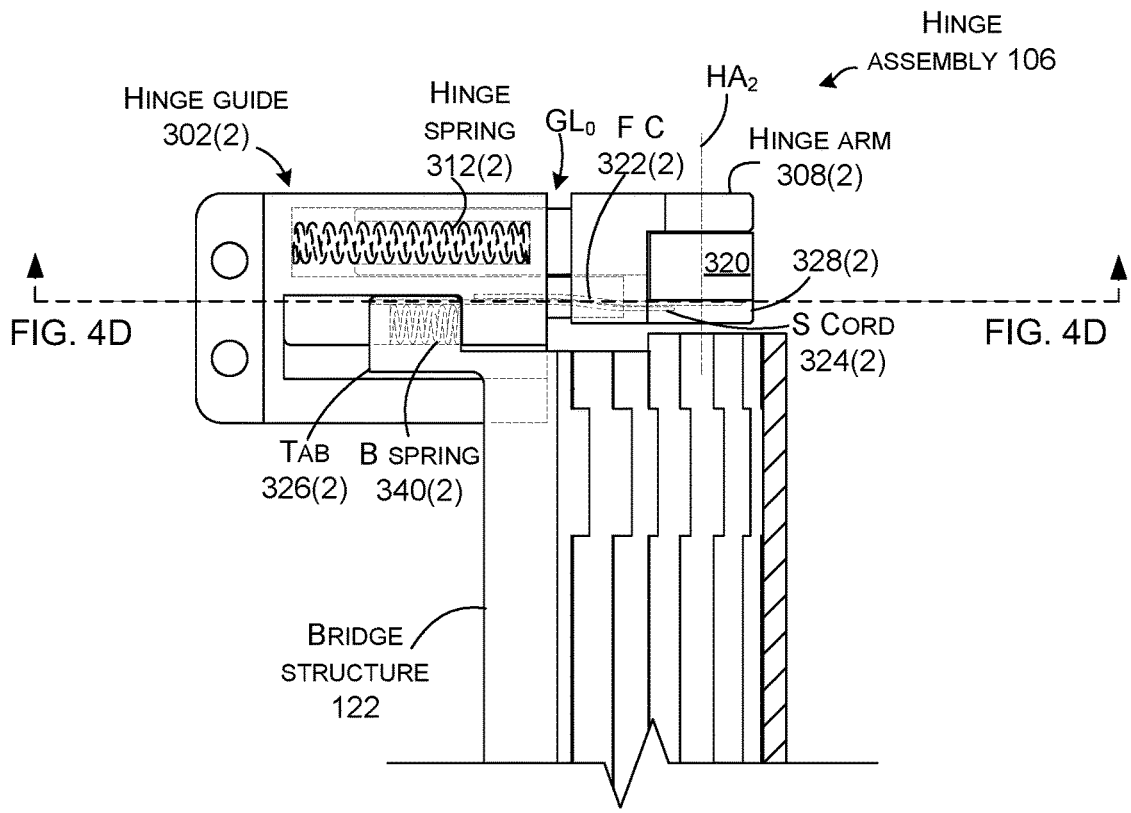
Figure 5A:
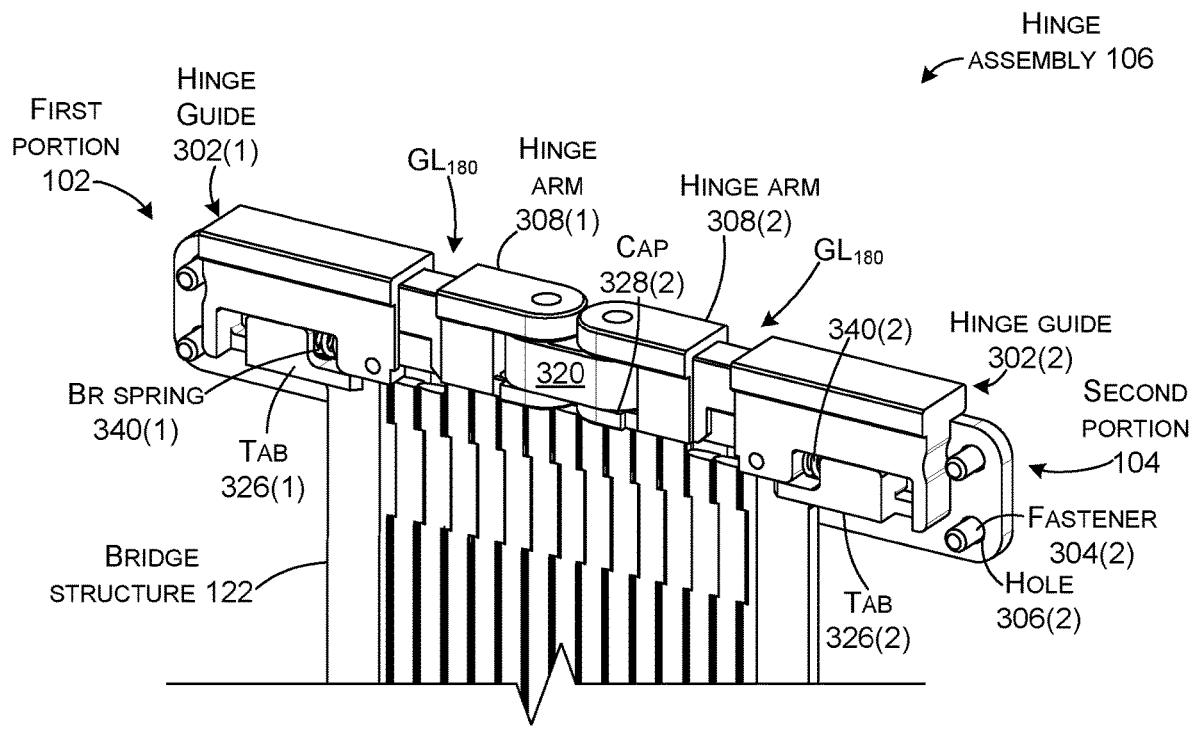
Figure 5B:
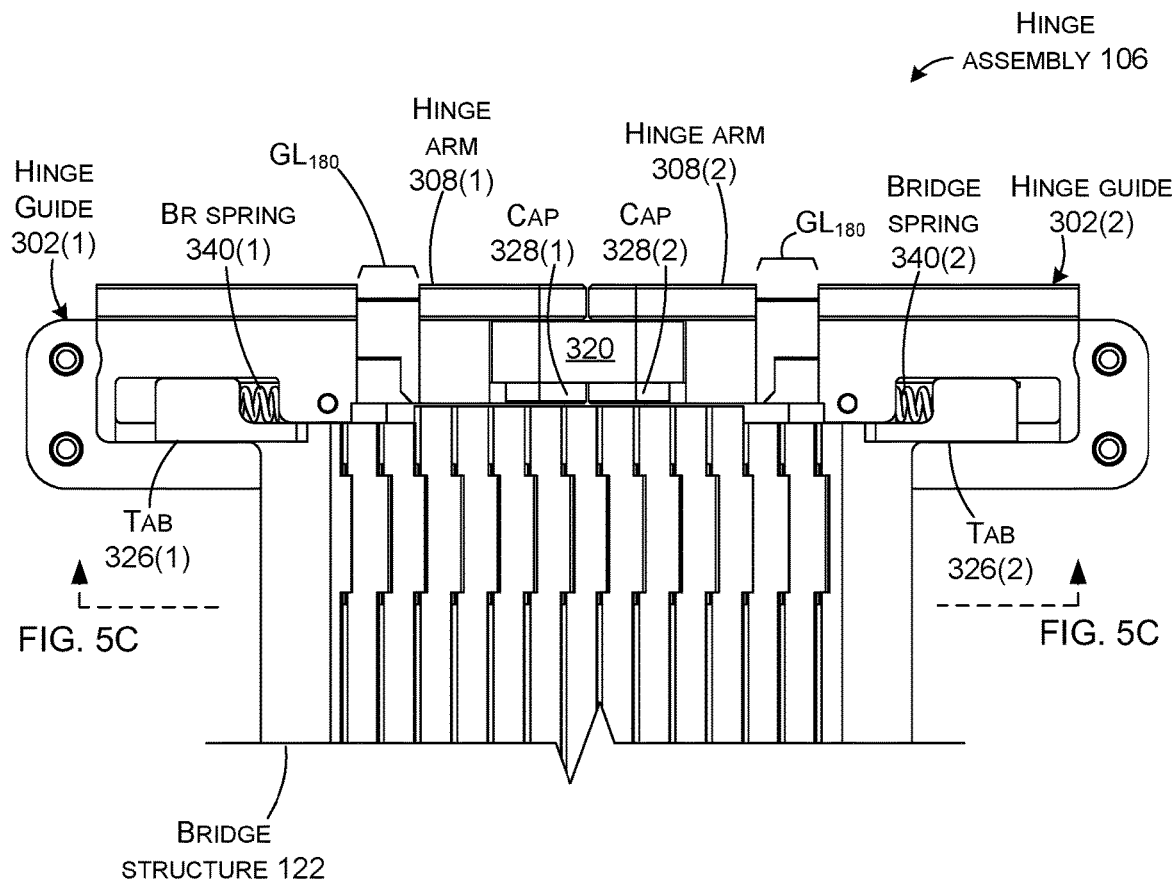
Figure 5C:
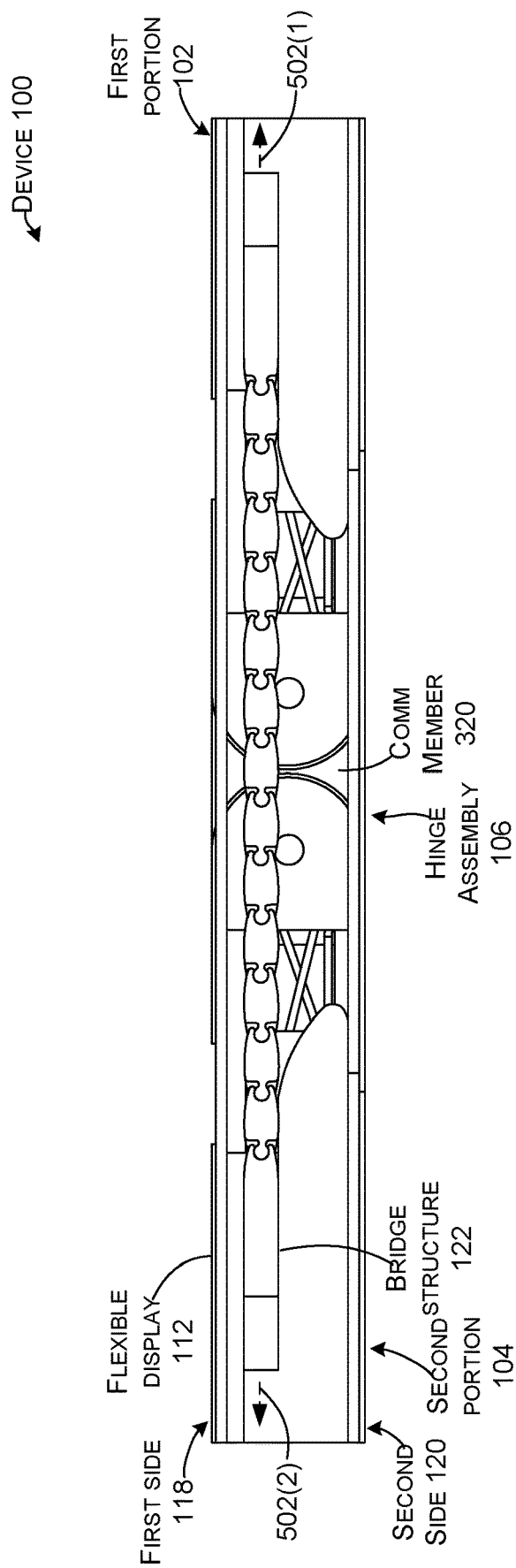
Figure 5D:
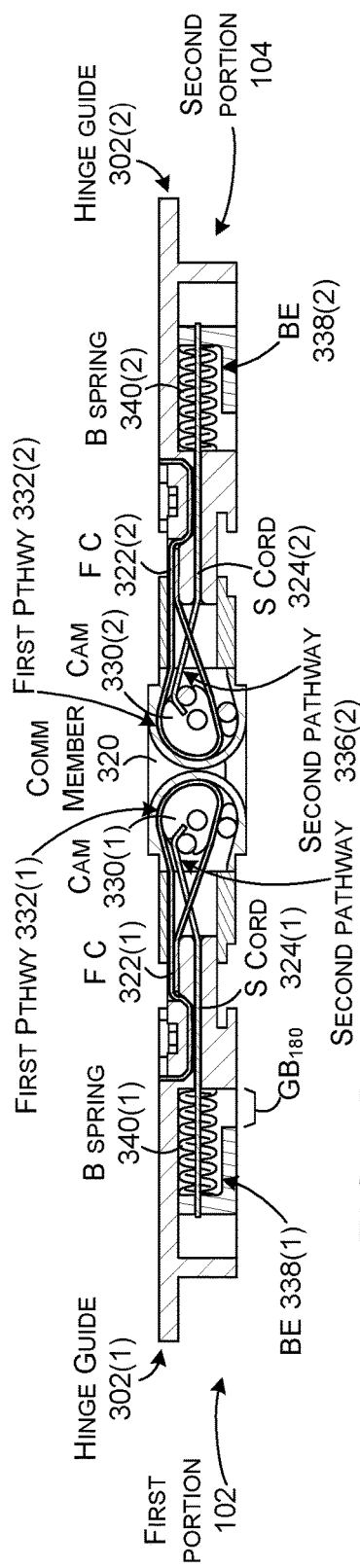
Figure 5E:
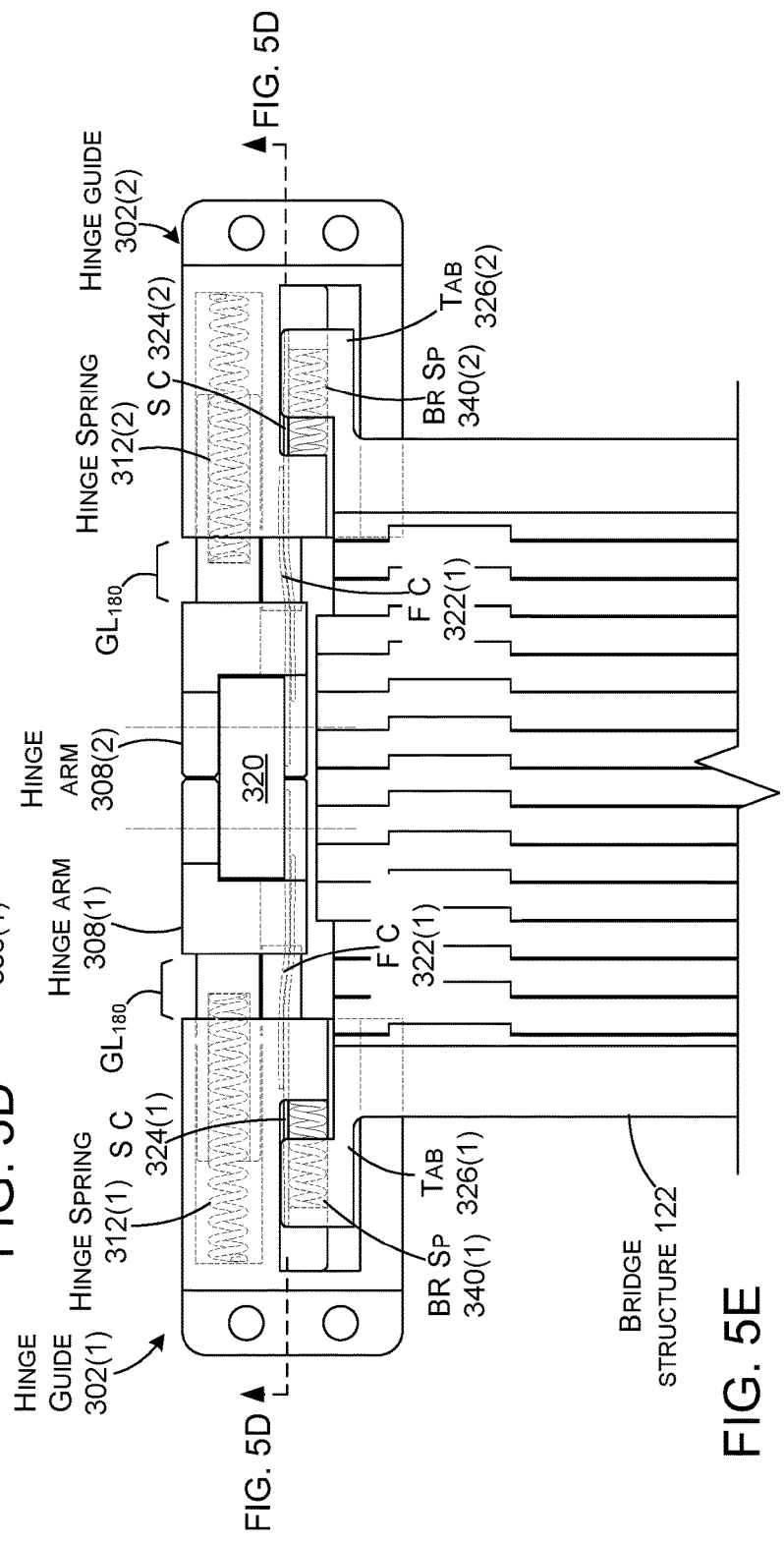
Figure 6A:
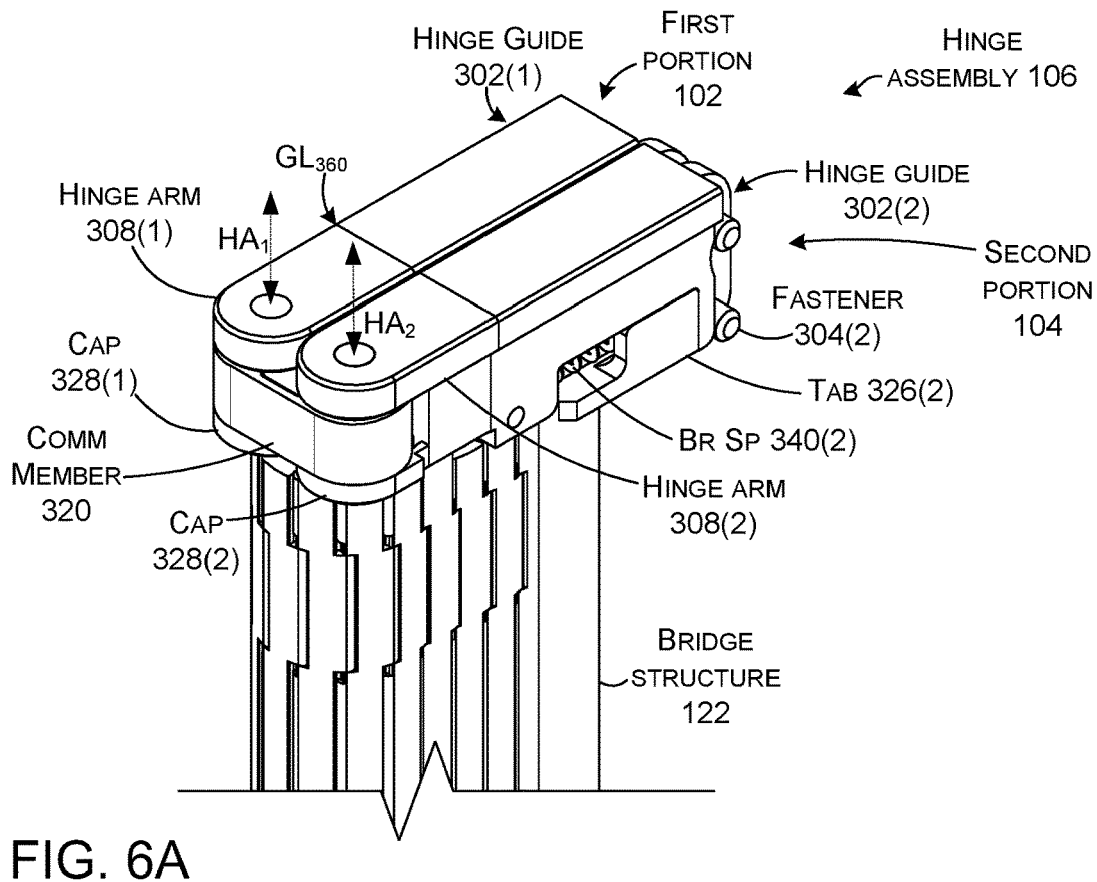
Figure 6B:
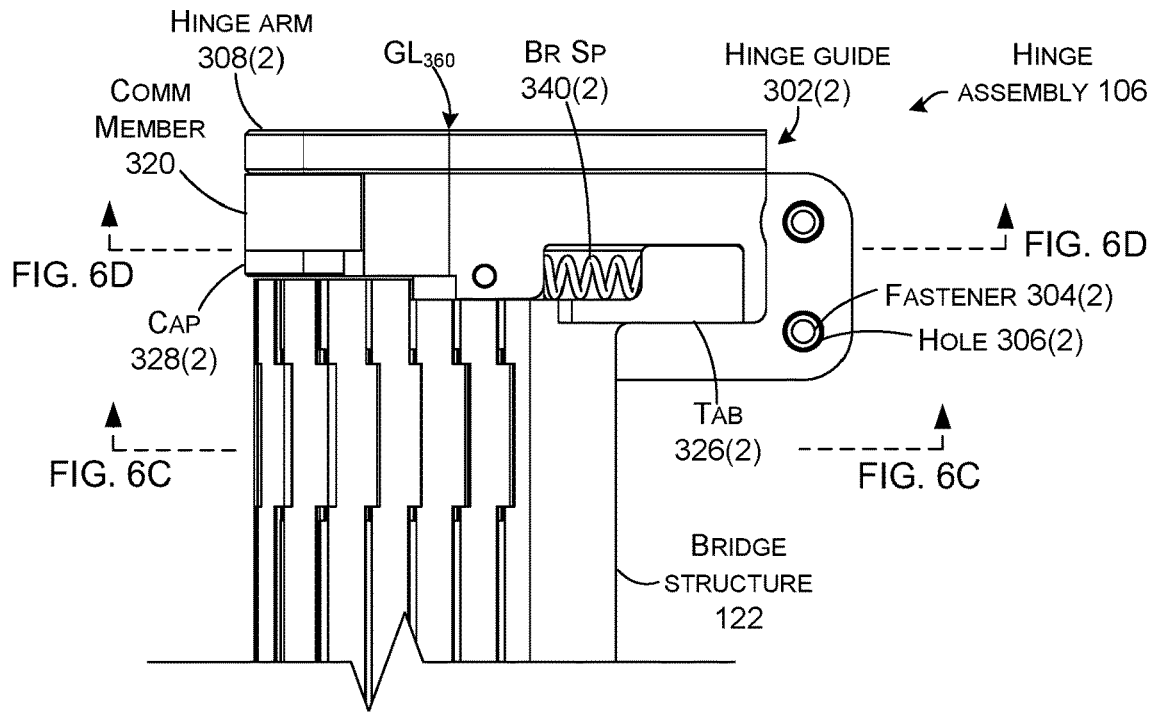
Figure 6C:
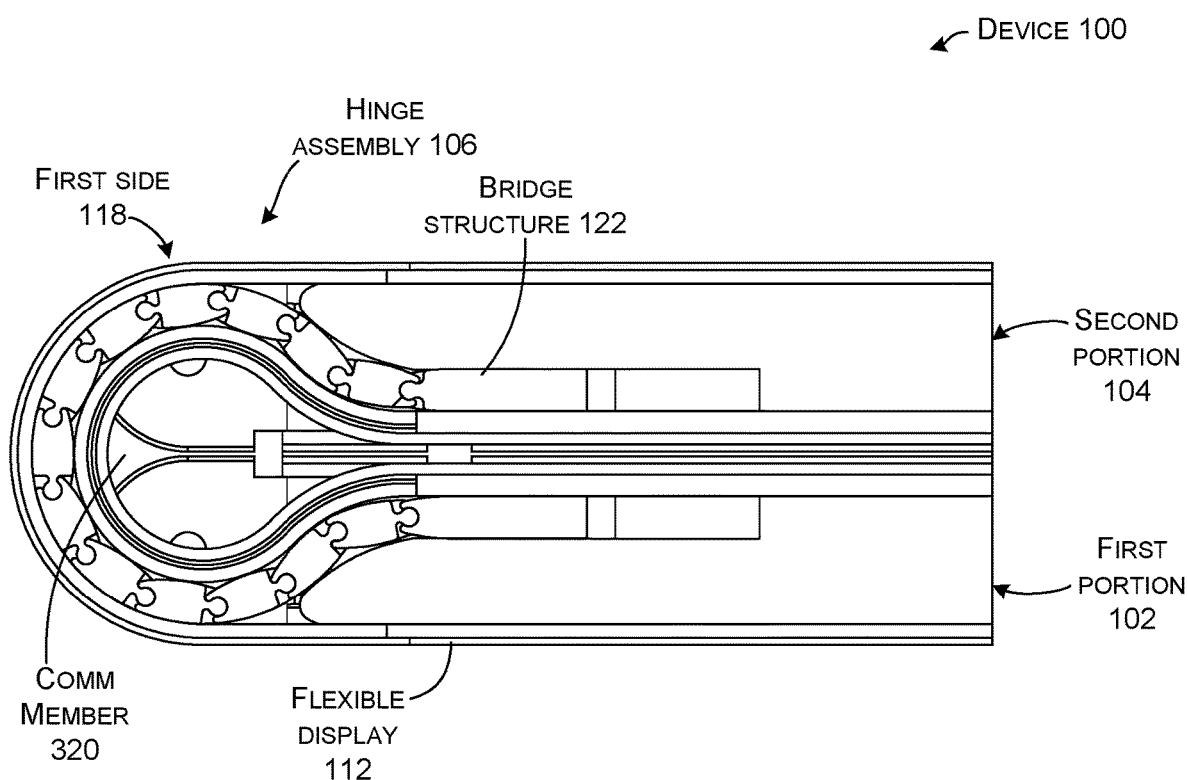
Figure 6D:
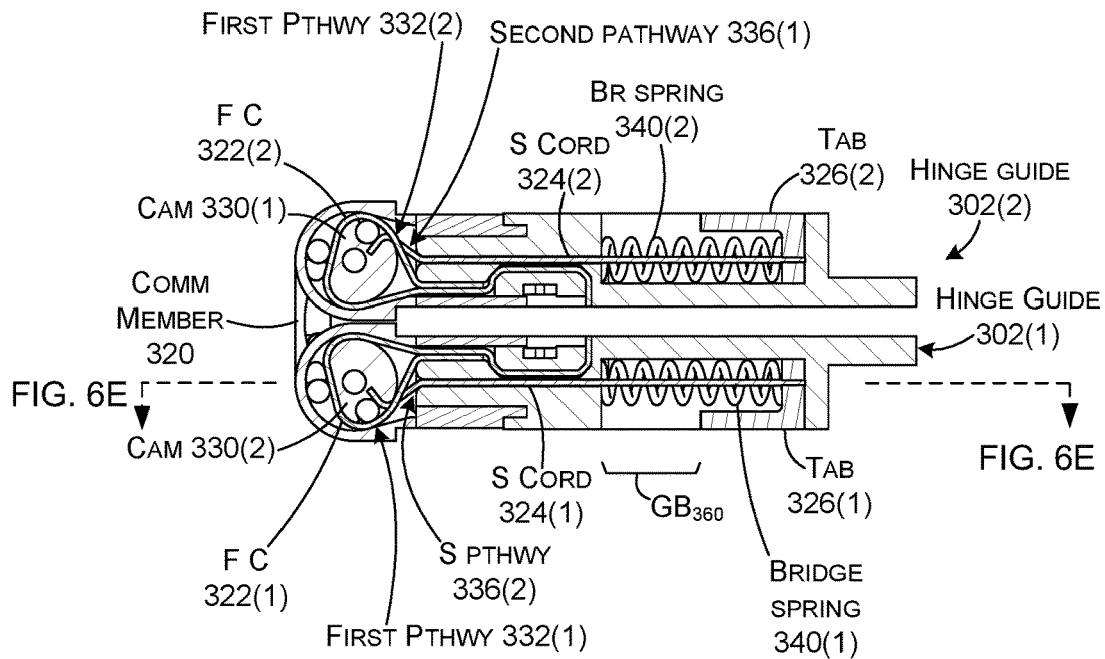
Figure 6E:
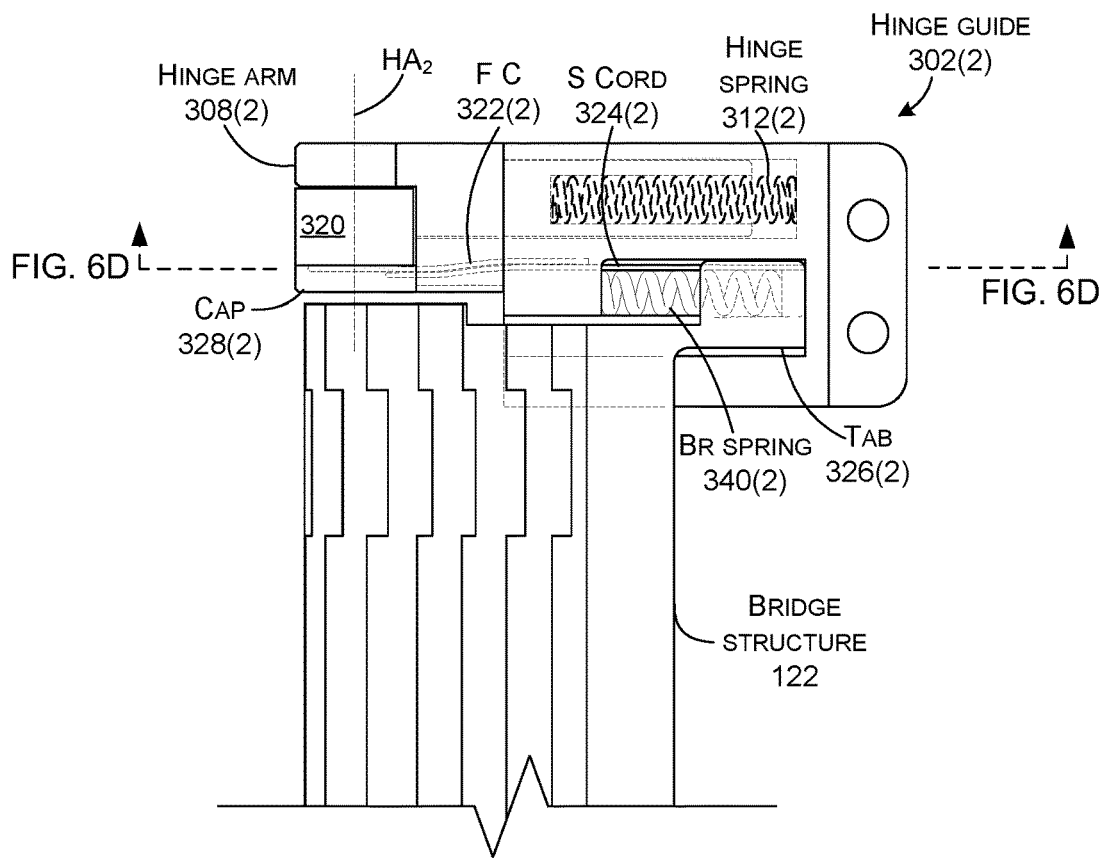

Recall also, that bridge springs 340 are acting upon tabs 326 to bias the ends of the bridge structure 122 away from one another (e.g., bias tabs 326 to the left in FIG. 4D away from the communication member 320). However, in this orientation the cams 330 are causing second pathways 336 to be relatively long. Being exposed to the relatively long second pathways 336 causes the second cords 324 to overcome the bias of the bridge springs 340 and pull the tabs 326 toward one another (toward the communication member 320). Pulling the tabs 326 toward the communication member causes the tabs 326 to contact the hinge guides 302 as reflected by a gap between the two (e.g., gap of the bridge at the zero-degree orientation $GB_0$) to be zero, in this implementation. Further, pulling the tabs 326 toward one another causes the bridge structure 122 to distend in an arc at the hinge assembly as indicated at 402 in FIG. 4C. (Stated another way, the relationship of the second cords and second pathways can at least in part control the shape (e.g., the arc) of the bridge structure). This distention creates room for the flexible display 112 to gradually bend at the hinge assembly 106 as indicated at 404 rather than being forced into a shorter radius bend that would likely damage the flexible display 112.

In this implementation, adjacent slats 327 are pivotably related to one another. In other implementations, the slats could be alternatively or additionally slideably related to one another. For instance, a portion of a first slat could slide over a portion of an adjacent second slat when the bridge structure is curved and slide off of the portion when the bridge structure is straight. In the present implementation the slats are pivotably related by a bulbous protuberance 406 of one slat being retained in a correspondingly shaped slot 408 in the adjacent slot. Other mechanisms for pivotably associating adjacent slats can be employed. Other bridge structures that do not employ slots are contemplated. For instance, the bridge structure 122 could be formed of a single sheet of material, such as a polymer, that was bendable but provided support to the flexible display 112.

FIGS. 5A-5E show the first and second portions 102 and 104 of the device rotated to a 180-degree orientation. At this point, the second cords 324 are experiencing a relatively short second pathway 336. This relatively short second pathway can allow the bridge springs 340 to bias the tabs 326 away from one another as indicated by arrows 502 (FIG. 5C) and evidenced by the enlarged bridge gap $GB_{180}$ (FIG. 5D) compared to the zero-degree orientation of FIGS. 4A-4E. Biasing the tabs 326 away from one another causes the bridge structure 122 to be drawn taut between the hinge assembly 106 and the flexible display 112. Stated another way, the tension imparted by the biasing element on the tabs can control a shape of the bridge structure (e.g., in this orientation cause the bridge structure to be linear). Thus, in this orientation, the bridge structure 122 can support the flexible display 112 to create a similar resistance to downward pressure as may be experienced over the first and second portions 102 and 104.

At the 180-degree orientation, the first cords 322 also experience relatively shorter first pathways 332 than in the zero-degree orientation, due at least in part to the orientation of cams 330. The relatively shorter first pathways 332 can allow the hinge springs 312 to bias the hinge guides 302 away from the hinge arms 308 (e.g., away from the hinge assembly 106). Biasing the hinge guides 302 away from the hinge arms 308 effectively increases the length (e.g., effective length) of the device under the flexible display 112 so that at this orientation, the length of the device under the flexible display is equivalent to the length of the flexible display 112. Thus, the flexible display is not exposed to tension or compression forces.

FIGS. 6A-6E show the device 100 rotated to the 360-degree orientation with the first side 118 and the flexible display 112 facing outwardly and the second side 120 facing inwardly. With the flexible display 112 positioned on the outside of the device around the hinge assembly 106 (e.g., around the ends of the first and second portions 102 and 104), the flexible display 112 would traditionally be exposed to tension forces that would damage the flexible display and/or its electrical connections. However, in the present implementations, the cams 330 cause the first cords 322 to experience relatively long first pathways (e.g., longer than both the zero-degree orientation and the 180-degree orientation). The relatively long first pathways 332 cause the first cords 322 to overcome the bias of the hinge springs 312 and pull the hinge guides 302 toward the hinge arms 308 (e.g., toward the hinge assembly 106). This movement is evidenced by the length gap $GL_{360}$ being less than in the zero-degree and 180-degree orientations. In this implementation, length gap $GL_{360}$ is zero (e.g., the hinge guides 302 are touching the hinge arms 308). The decrease in the gap length represents shortening of the effective length of the device 100 under the flexible display 112. Shortening the effective length of the device under the flexible display reduces and/or eliminates the potential tension forces mentioned above that could damage the flexible display.

In this 360-degree orientation, the second cords 324 are exposed to relatively short second pathways 336. As such, the second cords 324 can allow the bridge springs 340 to bias the tabs 326 away from one another (e.g., away from the hinge assembly 106). This is evidenced by the relatively large bridge gap $GB_{360}$ between the tabs 326 and the hinge guides 302. Biasing the tabs 326 away from one another can put the bridge structure 122 under tension as it wraps around the hinge assembly 106. The tension can control a shape of the bridge structure by causing the bridge structure 122 to conform to the contour defined by the hinge assembly 106 and/or the ends of the first and second portions 102 and 104 so that the bridge structure 122 does not protrude in a manner that would impart outward forces on the flexible display 112.

Individual orientations of the first and second portions 102 and 104 are illustrated and described. However, the inter-relations of the first cords 322 and first pathways 332 with the hinge springs 312 and the second cords 324 and second pathways 336 with the bridge springs 340 allows the hinge assembly 106 to accommodate the length of the device 100 under the flexible display 112 at any orientation and to affect the configuration of the bridge structure 122 at any orientation.

Individual elements of the hinge assemblies 106 can be made from various materials, such as metals, plastics, foams, polymers, and/or composites. These materials can be prepared in various ways, such as in the form of sheet metals, die cast metals, machined metals, metal injection moldings, 3D printed materials, molded or 3D printed plastics, and/or molded or 3D printed composites, among others, or any combination of these (and/or other) materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-6E.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a device comprising a first portion and a second portion, a hinge assembly slideably secured to the first portion and the second portion, the hinge assembly defining a cam and another cam, a flexible display secured to the first portion and the second portion, and a bridge structure positioned between the flexible display and the hinge assembly. The device can also include a cord that extends between the cam and the first portion and controls a gap between the first portion and the hinge assembly depending upon an orientation of the first and second portions and another cord that extends between the another cam and the bridge structure and controls a length of the bridge structure depending upon the orientation of the first and second portions.

Another example can include any of the above and/or below examples where the cam comprises first and second cams and the cord comprises first and second cords and wherein the first cam and the first cord control the gap between the first portion and the hinge assembly and the second cam and the second cord control a second gap between the second portion and the hinge assembly.

Another example can include any of the above and/or below examples where the device further comprises a spring that biases the first portion away from the hinge assembly to increase the gap and wherein in some orientations the cord overcomes the bias and pulls the first portion toward the hinge assembly to decrease the gap.

Another example can include any of the above and/or below examples where the cam and the another cam comprise the same cam.

Another example can include any of the above and/or below examples where the cam and the another cam comprise different cams Another example can include any of the above and/or below examples where the another cam comprises third and fourth cams and the another cord comprises third and fourth cords, and wherein the third cam and the third cord pull a first end of the bridge structure towards the hinge assembly, and wherein the fourth cam and fourth cord pull a second end of the bridge structure toward the hinge assembly.

Another example can include any of the above and/or below examples where the device further comprises a first spring that biases the first end of the bridge structure away from the hinge assembly and a second spring that biases the second end of the bridge structure away from the hinge assembly Another example can include any of the above and/or below examples where at a zero-degree orientation between the first and second portions, the third and fourth cams cause the cord to overcome the bias and pull the first end and the second end of the bridge structure toward the hinge assembly to shorten an effective length of the bridge structure.

Another example can include any of the above and/or below examples where at a 180-degree orientation between the first and second portions, the third and fourth cams cause the cord to allow the first and second springs to bias the first and second ends of the bridge structure away from one another to increase an effective length of the bridge structure.

Another example includes a device comprising a first portion and a second portion, a hinge assembly secured to the first portion and the second portion, a flexible display secured to the first portion and the second portion, a support member positioned between the flexible display and the hinge assembly, a first cord that extends along a first pathway between the first portion and the hinge assembly and at least in part controls a length of the device as the first and second portions are rotated through a range of orientations, and a second cord coupling the hinge assembly and the support member and at least in part controls a position of the support member relative to the display during the range of orientations.

Another example can include any of the above and/or below examples where the device further comprises a biasing element that biases the first portion away from the hinge assembly and further comprising a first pathway along which the first cord travels.

Another example can include any of the above and/or below examples where at a first orientation of the first and second portions, the first pathway is relatively shorter and the first cord allows the biasing element to bias the first portion away from the hinge assembly.

Another example can include any of the above and/or below examples where at a second orientation of the first and second portions, the first pathway is relatively longer and the first cord overcomes the bias and pulls the first portion toward the hinge assembly.

Another example can include any of the above and/or below examples where the device further comprises a support member biasing element that biases opposing ends of the support member away from the hinge assembly.

Another example can include any of the above and/or below examples where the device further comprises a second cord pathway along which the second cord travels.

Another example can include any of the above and/or below examples where at a first orientation of the first and second portions, the second cord pathway is relatively shorter and the second cord allows the support member biasing element to bias the ends of the support member away from the hinge assembly.

Another example can include any of the above and/or below examples where at a second orientation of the first and second portions, the second cord pathway is relatively longer and the second cord overcomes the bias and pulls the opposing ends of the support member towards the hinge assembly.

Another example includes a device comprising a first portion and a second portion, a hinge assembly secured to the first portion and the second portion, a flexible display secured to the first portion and the second portion, a support member positioned between the hinge assembly and the flexible display, and the hinge assembly configured to control a length of the device as defined by the first portion, the hinge assembly, and the second portion, based at least in part upon an orientation of the first and second portions, and configured to control a shape of the support member based at least in part upon the orientation of the first and second portions.

Another example can include any of the above and/or below examples where the hinge assembly defines a pathway for a cord that extends between the hinge assembly and the first portion.

Another example can include any of the above and/or below examples where the hinge assembly defines a hinge axis and the pathway includes a cam positioned around a hinge axis.

Another example can include any of the above and/or below examples where the cam changes the length of the pathway as the first portion is rotated around the hinge axis.

The invention claimed is:

1. A device, comprising:
a first portion and a second portion;
a hinge assembly secured to the first portion and the second portion;
a flexible display secured to the first portion and the second portion;
a support member positioned between the flexible display and the hinge assembly;
a first cord that extends along a first pathway between the first portion and the hinge assembly and at least in part controls a length of the device underlying the flexible display as the first and second portions are rotated through a range of orientations and at a first orientation the first pathway is relatively shorter than at a second orientation; and,
a second cord coupling the hinge assembly and the support member proximate to the first portion and at least in part controls a position of the support member relative to the flexible display during the range of orientations.

2. The device of claim 1, further comprising a biasing element that biases the first portion away from the hinge assembly.

3. The device of claim 2, wherein at the first orientation the first cord allows the biasing element to bias the first portion away from the hinge assembly.

4. The device of claim 3, wherein at the second orientation of the first and second portions, the first pathway is relatively longer and the first cord overcomes the bias and pulls the first portion toward the hinge assembly.

5. The device of claim 1, further comprising a support member biasing element that biases opposing ends of the support member away from the hinge assembly.

6. The device of claim 5, further comprising a second cord pathway along which the second cord travels.

7. The device of claim 6, wherein at the first orientation of the first and second portions, the second cord pathway is relatively shorter than at the second orientation and the second cord allows the support member biasing element to bias the ends of the support member away from the hinge assembly.

8. The device of claim 6, wherein at the second orientation of the first and second portions, the second cord pathway is relatively longer and the second cord overcomes the bias and pulls the opposing ends of the support member towards the hinge assembly.

9. The device of claim 4, wherein the first orientation is 180 degrees and the second orientation is zero degrees.

10. The device of claim 9, further comprising a third orientation of 360 degrees and wherein the first pathway is shorter at 360 degrees than at 180 degrees but longer than at zero degrees.

11. The device of claim 1, wherein a change in the length of the device is reflected in a change in a gap length between the hinge assembly and the first portion.

12. The device of claim 8, wherein the first orientation is 180 degrees and the second orientation is zero degrees.

13. The device of claim 8, wherein the first orientation is 180 degrees and the second orientation is 360 degrees.

14. A device, comprising:
a hinge assembly secured to a first portion and a second portion;
a flexible display secured relative to the first portion and the second portion;
a support member positioned between the flexible display and the hinge assembly;
a first cord that extends along a first pathway between the first portion and the hinge assembly and at least in part controls a length of the device underlying the flexible display as the first and second portions are rotated through a range of orientations; and,
a second cord coupling the hinge assembly and the support member proximate to the first portion along a second pathway and at least in part controls a position of the support member between the hinge assembly and the flexible display as the second pathway changes during the range of orientations from a relatively shorter length at a first orientation to a relatively longer length at a second orientation.

15. The device of claim 14, further comprising a support member biasing element that biases an end of the support member away from the hinge assembly.

16. The device of claim 15, wherein the support member biasing element is a spring that is compressed between the hinge assembly and the end of the support member.

17. The device of claim 16, wherein at the first orientation the second pathway is relatively short and the spring biases the end away from the hinge assembly.

18. The device of claim 17, wherein at the second orientation the second pathway is relatively long and the second cord overcomes the bias and pulls the end toward the hinge assembly.

19. A device, comprising:
a hinge assembly securing a first portion and a second portion;
a support member positioned over the hinge assembly;
a first cord that extends along a first pathway between the first portion and the hinge assembly and a length of the first pathway changes based upon an orientation of the device and at least in part controls a length of the device as measured along the first portion, the hinge assembly, and the second portion as the first and second portions are rotated through a range of orientations; and,
a second cord that couples the hinge assembly and the support member proximate to the first portion and at least in part controls a position of the support member over the hinge assembly during the range of orientations from a relatively shorter length at a first orientation to a relatively longer length at a second orientation.

* * * * *